United States Patent
Biggerstaff et al.

(10) Patent No.: US 10,822,549 B2
(45) Date of Patent: Nov. 3, 2020

(54) METHODS AND COMPOUNDS FOR REMOVING NON-ACIDIC CONTAMINANTS FROM HYDROCARBON STREAMS

(71) Applicant: Baker Hughes, a GE company, LLC, Houston, TX (US)

(72) Inventors: Paul J. Biggerstaff, Sugar Land, TX (US); Jerry J. Weers, Richmond, TX (US); Sai Reddy Pinappu, Houston, TX (US); Weldon J. Cappel, Tomball, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/252,289

(22) Filed: Jan. 18, 2019

(65) Prior Publication Data

US 2020/0231881 A1   Jul. 23, 2020

(51) Int. Cl.
*C10G 21/20* (2006.01)
*C10G 21/28* (2006.01)

(52) U.S. Cl.
CPC .............. *C10G 21/20* (2013.01); *C10G 21/28* (2013.01); *C10G 2300/1074* (2013.01); *C10G 2300/202* (2013.01)

(58) Field of Classification Search
None
See application file for complete search history.

(56) References Cited

U.S. PATENT DOCUMENTS

| | | |
|---|---|---|
| 4,011,882 A | 3/1977 | Nivens et al. |
| 4,112,051 A | 9/1978 | Sartori et al. |

(Continued)

FOREIGN PATENT DOCUMENTS

| | | |
|---|---|---|
| CN | 102851069 A | 1/2013 |
| WO | 2008039205 A1 | 4/2008 |

(Continued)

OTHER PUBLICATIONS

Wang, Yuhe, et al., "Desulfurization of Liquid Fuels by Adsorption on Carbon-BasedSorbents and Ultrasound Assisted Sorbent Regeneration", American Chemical Society, Feb. 2007, 3825-3831.

*Primary Examiner* — Tam M Nguyen
(74) *Attorney, Agent, or Firm* — Mossman, Kumar & Tyler, P.C.

(57) ABSTRACT

An extraction solvent comprised of one or more ethyleneamines having structure (I), (II), or (III):

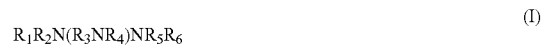

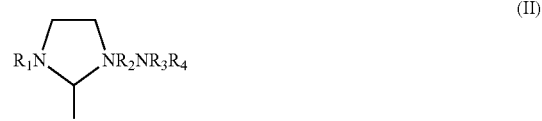

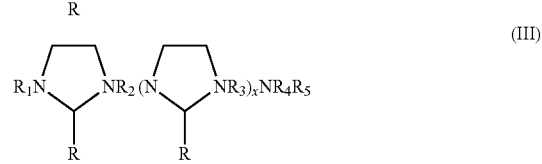

where $R_1$-$R_6$ can independently be H, $C_1$-$C_4$ linear or branched alkyl, amido (RRNC=O), or hydroxyalkyl, where each R in the amido group independently H or $C_1$ alkyl, and where x ranges from 1 to 6, may be contacted with a hydrocarbon stream to remove or extract non-acidic contaminants, such as thiophenes, benzothiophenes, alkyl sulfides, alkyl disulfides, mercaptans, aromatics, oxygenates, metals, olefins, and combinations thereof, from the hydro- (Continued)

carbon stream. The extraction solvent may include co-solvents and the hydrocarbon stream may be in gas and/or liquid form.

10 Claims, 1 Drawing Sheet

(56) References Cited

U.S. PATENT DOCUMENTS

| | | | |
|---|---|---|---|
| 4,122,149 A | 10/1978 | Dunnery et al. | |
| 4,746,420 A | 5/1988 | Darian et al. | |
| 5,284,576 A | 2/1994 | Weers et al. | |
| 5,413,627 A * | 5/1995 | Landeck | B01D 53/14 |
| | | | 423/210 |
| 5,486,605 A | 1/1996 | Gatlin | |
| 5,500,126 A | 3/1996 | Fries | |
| 5,689,033 A | 11/1997 | Forte et al. | |
| 5,935,422 A | 8/1999 | Zinnen | |
| 6,406,616 B1 | 6/2002 | Rappas et al. | |
| 6,488,840 B1 | 12/2002 | Greaney et al. | |
| 6,551,502 B1 | 4/2003 | Lee et al. | |
| 6,558,533 B2 | 5/2003 | Schmidt et al. | |
| 6,623,627 B1 | 9/2003 | Zhou | |
| 7,128,829 B1 | 10/2006 | Kulprathipanja et al. | |
| 7,144,499 B2 | 12/2006 | Han et al. | |
| 7,186,328 B1 | 3/2007 | Schultz et al. | |
| 7,244,352 B2 | 7/2007 | Halbert et al. | |
| 7,344,686 B2 | 3/2008 | Poshusta et al. | |
| 7,727,383 B2 | 6/2010 | Lin et al. | |
| 8,142,646 B2 | 3/2012 | Choi et al. | |
| 8,343,336 B2 | 1/2013 | Hamad et al. | |
| 8,562,821 B2 | 10/2013 | Nanoti et al. | |
| 9,340,808 B2 | 5/2016 | Harata et al. | |
| 2005/0173297 A1 | 8/2005 | Toida | |
| 2008/0053920 A1 | 3/2008 | Pakulski et al. | |
| 2013/0093313 A1 | 4/2013 | Oyamada | |
| 2013/0167433 A1 | 7/2013 | Liu et al. | |
| 2016/0207854 A1 | 7/2016 | Weissheimer et al. | |

FOREIGN PATENT DOCUMENTS

| | | |
|---|---|---|
| WO | 2017184591 A1 | 10/2017 |
| WO | 2018009497 A1 | 1/2018 |

* cited by examiner

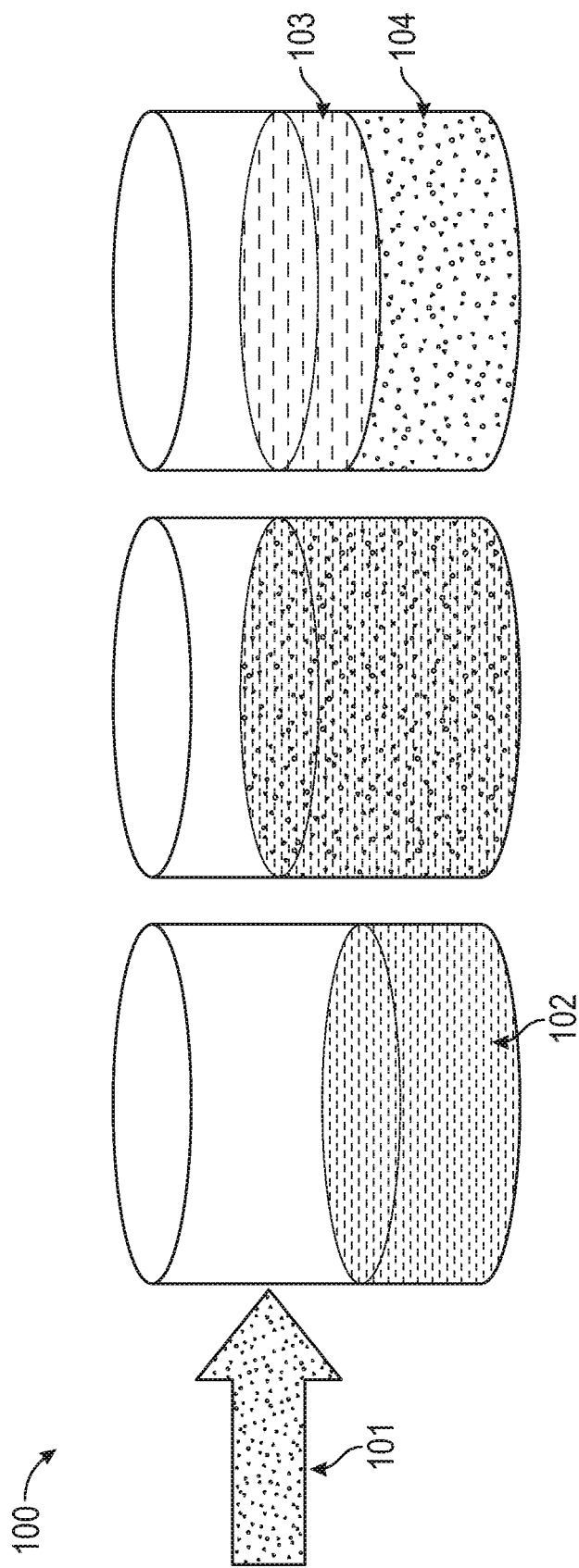

METHODS AND COMPOUNDS FOR REMOVING NON-ACIDIC CONTAMINANTS FROM HYDROCARBON STREAMS

TECHNICAL FIELD

The present invention relates to methods and compounds for removal of non-acidic contaminants from a hydrocarbon stream, and more particularly relates, in one non-limiting embodiment, to contacting an extraction solvent comprising one or more ethyleneamines and derivatives thereof with a hydrocarbon stream to remove at least a portion of non-acidic contaminants from the hydrocarbon stream.

BACKGROUND

New domestic regulations and international standards aimed at reducing emissions from the burning of fuels for energy are putting ever-increasing restrictions on the allowable sulfur content of finished hydrocarbon streams across the global oil & gas industry.

As part of the ongoing initiative to improve ambient air quality, the U.S. Environmental Protection Agency (EPA) in 2017 revised their gasoline standards around sulfur content from the previous Tier 2 specifications to the new Tier 3 specifications. Consequently, refineries are being forced to reduce the total sulfur content in light hydrocarbons that may be used as blend components in their finished gasoline or diesel pools. They also have to find new and novel ways to lower the sulfur content in finished fuels that may be off specification for sulfur content after processing. Traditional processing technologies for sulfur removal from hydrocarbon streams in petroleum refining industries mainly include catalytic hydro-desulfurization (HDS or Hydrotreater), and/or the use of a combination of mechanical and chemical treatment systems. For example, it is common in refinery processes to use caustic soda as part of a caustic treater unit and certain amines (ethanolamines in particular) as part of an amine scrubber unit.

Designed in alignment with refinery capacity, these technologies are usually capable of processing large volumes and they provide a certain level of operation flexibility for constantly changing feedstocks regarding sulfur species and sulfur levels. However, with higher desulfurization demands on both throughput and sulfur removal efficiency, these processes still leave fundamental gaps in responding to the sulfur removal needs. For example, while a caustic scrubber is efficient at removing acidic species like $H_2S$ (hydrogen sulfide) and lower molecular weight mercaptans, and an amine unit is efficient at removing $H_2S$ and acidic $CO_2$, these processes have very limited impact on any of the non-acidic sulfur compounds that are commonly found in refinery intermediate and blend streams, such as carbonyl sulfide (COS), dimethyl disulfide (DMDS), dimethyl sulfide (DMS), carbon disulfide ($CS_2$), thiophenes, as well as, olefins, oxygenates, aromatics and metals.

Removal of such non-acidic contaminants have been accomplished via methods such as extractive distillation or a liquid-liquid extraction. As shown in the illustration in FIG. 1, in a liquid-liquid extraction process 100, a hydrocarbon stream containing non-acidic contaminants 101 of the kinds described above is contacted/reacted with an extraction solvent 102 to extract contaminants from the hydrocarbon stream into the solvent and separate the two liquids into a hydrocarbon stream with a reduced amount of non-acidic contaminants 103 and an extraction solvent stream laden with non-acidic contaminants 104. Separation of the liquids after contact is critical to the efficacy of the extraction process. Therefore, not only must a contaminant and/or its reaction adduct be soluble in the extraction solvent, the contaminant-laden solvent must be immiscible in the hydrocarbon stream being treated.

Some extraction solvents commonly used in liquid-liquid extractions include sulfolanes, pyrrolidones, glycols, carbonates, morpholine, furfural, alcohols and hydroxylamines. While these chemistries have been shown to provide marginal sulfur-contaminant reduction across a wider array of sulfur compounds compared to traditional refinery processes, they have also been found to be completely soluble in the hydrocarbon stream and have resulted in little or no separation of the hydrocarbon stream from the contaminant-laden extraction stream.

Therefore, a need still exists for an extraction solvent having improved extraction efficacy to meet the more stringent sulfur limits for hydrocarbon streams that have been set by the EPA and other regulatory bodies.

SUMMARY

There is provided, in one form, a process for removal of non-acidic contaminants from a hydrocarbon stream comprising the contaminants in which the hydrocarbon stream containing non-acidic contaminants is contacted with an extraction solvent comprising one or more ethyleneamines having structure (I), (II), or (III):

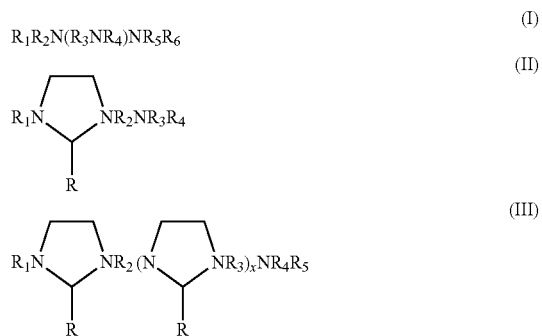

where $R_1$-$R_6$ can independently be H, $C_1$-$C_4$ linear or branched alkyl, amido (RRNC=O), or hydroxyalkyl, where each R in the amido group is independently H or $C_1$ alkyl, and where x ranges from 1 to 6. In one non-limiting embodiment, the non-acidic contaminants are of thiophenes, benzothiophenes, alkyl sulfides, disulfides, mercaptans, aromatics, oxygenates, metals, and/or olefins.

There is further provided in another form, a treated fluid comprising, in a ratio ranging from about 1:10 to about 95:100, a liquid or gas hydrocarbon stream containing non-acidic contaminants and an extraction solvent comprising one or more ethyleneamines having structure (I), (II), or (III):

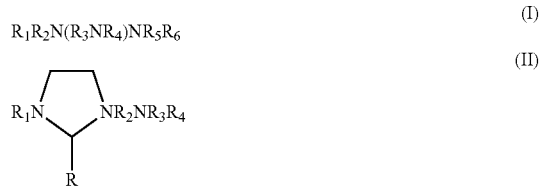

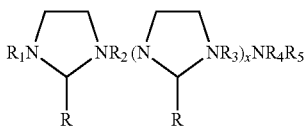

where $R_1$-$R_6$ can independently be H, $C_1$-$C_4$ linear or branched alkyl, amido (RRNC=O), or hydroxyalkyl, where each R in the amido group is independently H or $C_1$ alkyl, and where x ranges from 1 to 6.

BRIEF DESCRIPTION OF THE DRAWINGS

FIG. 1 is a schematic illustration of a liquid-liquid extraction process for removing non-acidic contaminants from a liquid hydrocarbon stream using an extraction solvent.

DETAILED DESCRIPTION

It has been discovered that contacting a hydrocarbon stream containing non-acidic contaminants with an effective amount of an extraction solvent comprising ethyleneamines of a certain structure is useful or effective for removing the non-acidic contaminants from the hydrocarbon stream.

In one embodiment, the extraction solvent useful for contaminant removal may comprise one or more ethyleneamines having the following general structure:

$$R_1R_2N(R_3NR_4)NR_5R_6 \quad (I)$$

where $R_1$-$R_6$ can independently be H, $C_1$-$C_4$ linear or branched alkyl, amido (RRNC=O), or hydroxyalkyl, and where each R in the amido group is independently H or $C_1$ alkyl. Non-exclusive examples of useful and effective extraction solvents falling under this formula are diethylenediamine, diethylenetriamine (DETA), and triethylenetriamine (TETA).

In another non-limiting embodiment, the one or more ethyleneamines to be used in the extraction solvent may have the following structure (II):

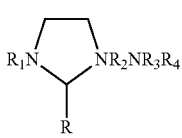

where $R_1$-$R_4$ can independently be H, $C_1$-$C_4$ linear or branched alkyl, amido (RRNC=O), or hydroxyalkyl, and where each R in the amido group is independently H or $C_1$ alkyl.

The one or more ethyleneamines may also have the following structure (III):

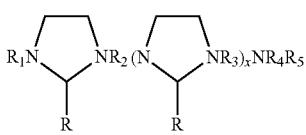

where R-$R_5$ can independently be H, $C_1$-$C_4$ linear or branched alkyl, amido (RRNC=O), or hydroxyalkyl, where each R in the amido group is independently H or $C_1$ alkyl, and where x ranges from 1 to 6.

It is understood that the choice of R groups is made with the goal of optimizing the immiscibility or insolubility of the extraction solvent with hydrocarbon stream being treated in order to facilitate separation of the contaminant-laden extractive solvent stream from the hydrocarbon stream after they are contacted or mixed.

The extraction solvent may further comprise a co-solvent that is compatible with the one or more ethyleneamines described above and that is substantially insoluble in the hydrocarbon stream. Non-limiting examples of co-solvents that may meet this criteria include, but are not limited to, water, alcohols, glycols, amides, ester, amines, quaternary ammonium compounds, carbonates, ketones and combinations thereof.

The hydrocarbon stream to be treated with an extraction solvent comprised of one or more ethyleneamines of the kinds described above may be any industrial hydrocarbon stream, in liquid and/or gas form, that contains non-acidic contaminants. Such streams include, but are not limited to, refinery feedstock, particularly light petroleum gases (LPG), such as (iso)butane and (iso)propane, straight run distillates, cracked stocks, hydrotreated materials, and/or finished fuel blends. The hydrocarbon stream may contain from about 1 ppm to about 10,000 ppm of water, more typically from about 50 ppm to about 1,000 ppm of water.

The removal of the non-acidic contaminants from the hydrocarbon stream using the extraction solvent of the kind described herein may be accomplished, in one non-limiting embodiment, by the liquid-liquid extraction process shown in FIG. 1 in which the hydrocarbon stream containing non-acidic contaminants 101 is contacted/reacted/mixed with the extraction solvent 102 to extract the non-acidic contaminants from the hydrocarbon stream into the solvent and form two separate liquid phases: a hydrocarbon stream with a reduced amount of non-acidic contaminants 103 and an extraction solvent stream laden with non-acidic contaminants 104. In a non-limiting embodiment, the extraction process may have a counter-flow design, meaning that the hydrocarbon stream containing the non-acidic contaminants and the extraction solvent stream flow in opposite directions from one another prior to and while being contacted/mixed/reacted. In yet another non-limiting embodiment, the contacting of the hydrocarbon stream and the extraction solvent is achieved by injecting the extraction solvent directly into the hydrocarbon stream.

In a further process step, the contaminant-laden extraction solvent stream may be separated from the hydrocarbon stream having a reduced amount of non-acidic contaminants using a knockout drum, a centrifuge, and/or an absorbent material and the separated contaminant-laden extraction solvent stream may be regenerated by passing the contaminant-laden extraction solvent stream through selective filtration media or more adsorption material to remove the contaminants.

The non-acidic contaminants present in the hydrocarbon stream may be sulfur compounds, such as, without limitation, thiophenes, benzothiophenes, alkyl sulfides, alkyl disulfides, carbonyl sulfide (COS), carbon disulfide ($CS_2$), and combinations thereof. The non-acidic contaminants to be removed using the extraction solvent may also include, without limitation, mercaptans, aromatics, oxygenates, metals, olefins, and combinations thereof. In one non-limiting embodiment, mercaptans that may be removed by this method include, but are not necessarily limited to, straight chained or branched, primary, secondary or tertiary mercaptans with a carbon range of $C_1$-$C_5$. In another non-restrictive version, aromatics, including substituted and fused-ring aromatics that may be removed by this method include, but are not necessarily limited to, benzene, toluene, naphthalene, and anthracene. In a different non-limiting embodiment, oxygenates that may be removed by this method include, but are not necessarily limited to, straight chained or branched, primary, secondary, tertiary alcohols, and ethers. Further, metals that may be removed by this method include, but are not necessarily limited to, organics, including iron and chlorine, and inorganics, such as chlorides and FeS. Additionally, olefins that may be removed by this method include, but are not necessarily limited to, straight chained or branched, mono, di or poly olefins.

In one embodiment, the ratio of the amount of one or more ethyleneamines to the amount of hydrocarbon in the hydrocarbon stream may range from about 1:10 independently to about 95:100 independently, or from about 25:100 independently to about 75:100 independently, or may be about 50:50. For purposes of this disclosure, the term "independently" with respect to a range means that any threshold may be used together with any other threshold to form an acceptable alternative range In another exemplary embodiment, the ratio of the amount of one or more ethyleneamines to the amount of co-solvent in the extraction solvent may range from about 100:0.00001 independently to about 25:75 independently, or may be about 90:10.

A goal of the contacting the extraction solvent with the hydrocarbon stream containing non-acidic contaminants is to reduce the amount of contaminants to an acceptable environmental level. Complete removal of the contaminants from the hydrocarbon stream is desirable, but it should be appreciated that complete removal is not necessary for the methods and compounds discussed herein to be considered effective. Success is obtained if more contaminants are removed from the hydrocarbon stream using the extraction solvent described herein than in the absence of an effective amount of the extraction solvent, and particularly if the contaminants are reduced to an acceptable environmental level.

The invention will be further described with respect to the following Examples, which are not meant to limit the invention, but rather to further illustrate the various embodiments.

EXAMPLES

In one set of evaluations, samples of model hydrocarbons were prepared by adding known amounts of specific types of sulfur compounds. A mixture 40 mL of the model hydrocarbon and 40 mL of the extraction solvent was agitated for 5 minutes and then centrifuged at 1500 rpm for 15 minutes to separate the oil/water phases. A small sample of the hydrocarbon phase was then taken from the container and analyzed for total sulfur content using a XOS Sindie model 2622 10 sulfur analyzer via ASTM D7059. Sulfur reduction, as a percentage, was calculated using the following equation:

[(ppm sulfur in the untreated fuel)–(ppm sulfur in treated fuel)/(ppm sulfur in untreated fuel)]×100

In another set of evaluations, using the same testing method as set forth above, a few "clean" hydrocarbon (pentane, gasoline, kerosene, or ultra-low sulfur kerosene (ULSK)) samples were "spiked" with known amounts of specific sulfur compounds to understand which chemistries worked best in removing which sulfur compounds. These real field samples had a ratio of hydrocarbon to extraction solvent of 1:1.

The results of the evaluations of performance of the various extraction solvents contacted with the hydrocarbon samples is shown below in Tables 1-8. In the Tables, RSH stands for mercaptan, and thiophenes represent a mixture of 100 ppm each of tetrahydrothiophene, thiophene, and 2-methylthiophene.

The data in these Tables show that, in most instances, TETA and DETA do a better job of removing or reducing the amount of most of the sulfur compounds in these various hydrocarbon streams than most of the other extraction solvents tested.

TABLE 1

Comparing Reduction of Certain Sulfur Compounds in Model Hydrocarbons Using Various Extraction Solvents

| Extraction Solvent | Sulfur Compounds | Sulfur ppm | % Sulfur Reduction |
|---|---|---|---|
| Blank | Dimethylsulfide (DMS) | 177, 186 | — |
| Diethylenetriamine (DETA) | Dimethylsulfide (DMS) | 76 | 55% |
| 2-Pyrrolidone | Dimethylsulfide (DMS) | 92 | 45% |
| Fe dibutylamine 1:1 ratio | Dimethylsulfide (DMS) | 112 | 38% |
| NaBH4 (20%) + EDA | Dimethylsulfide (DMS) | 113 | 37% |
| EXALT 1100 + EDA | Dimethylsulfide (DMS) | 141 | 22% |
| Methanol/water 20/20ml | Dimethylsulfide (DMS) | 163 | 9% |
| Y17BH12119 (100 + MeOH) | Dimethylsulfide (DMS) | 171 | 8% |
| Y18BH12130 (Quat) | Dimethylsulfide (DMS) | 179 | 4% |
| 65% EXALT 1100 | Dimethylsulfide (DMS) | 184 | 1% |
| EXALT 1100 | Dimethylsulfide (DMS) | 186 | 0% |
| Blank | DMS, DMDS, Ethyl RSH | 285, 262, 275 | — |
| 2-Pyrrolidone | DMS, DMDS, Ethyl RSH | 106 | 63% |
| Diethylenetriamine (DETA) | DMS, DMDS, Ethyl RSH | 112.1 | 61% |
| Triethylentetraamine (TETA) | DMS, DMDS, Ethyl RSH | 111 | 60% |
| NaBH4/NMP | DMS, DMDS, Ethyl RSH | 158 | 43% |
| NaBH4 (6.5%)/DETA | DMS, DMDS, Ethyl RSH | 151.48 | 42% |
| Ethylamine | DMS, DMDS, Ethyl RSH | 165.7 | 42% |
| Monoethanolamine (MEA) | DMS, DMDS, Ethyl RSH | 195.4 | 31% |
| NaBH4 (17%)/Ethylamine | DMS, DMDS, Ethyl RSH | 197 | 28% |
| Quaternary Ammonium Hydroxide | DMS, DMDS, Ethyl RSH | 226 | 21% |

TABLE 1-continued

Comparing Reduction of Certain Sulfur Compounds in Model Hydrocarbons Using Various Extraction Solvents

| Extraction Solvent | Sulfur Compounds | Sulfur ppm | % Sulfur Reduction |
|---|---|---|---|
| Caustic/Glycerol/H2O | DMS, DMDS, Ethyl RSH | 223 | 19% |
| Quat/2-Pyrrolidone | DMS, DMDS, Ethyl RSH | 217.67 | 17% |
| NaBH4 (6.5%)/MEA | DMS, DMDS, Ethyl RSH | 221.36 | 16% |
| Caustic | DMS, DMDS, Ethyl RSH |  | 0%, 13% |
| Liquid Ammonia | DMS, DMDS, Ethyl RSH | 264.1 | 7% |
| Glycerine | DMS, DMDS, Ethyl RSH | 275.5 | 3% |

TABLE 2

Comparing Reduction of Certain Sulfur Compounds from Gasoline, Pentane, and Kerosene Using Caustic, Pyrrolidone, Quaternary Ammonium Hydroxide, DETA, and TETA

| Hydrocarbon Stream | Sulfur Compounds | Sulfur Content Blank, ppm-v | % Sulfur Reduction | | | | |
|---|---|---|---|---|---|---|---|
| | | | Caustic | Pyrrolidone (NMP) | Quaternary Ammonium Hydroxide | DETA | TETA |
| Refinery Gasoline | Ethyl Mercaptan | 188 | 23% | 57% | 43% | 69% | |
| Refinery Gasoline | Dimethylsulfide (DMS) | 177, 186 | 0 | 45% | 4% | 55% | 70% |
| Refinery Gasoline | Thiophenes | 223 | 0% | 50% | 2% | 43% | 63% |
| Refinery Gasoline | Carbon Disulfuide (CS2) | 207, 213 | 4% | 42% | 8% | 88% | 83% |
| Refinery Gasoline | Butyl Mercaptan | 114, 117 | 2% | 36% | 9% | 54% | — |
| Natural Gasoline | Various | 468, 448 | 13% | 33% | 17% | 40% | — |
| Natural Gasoline | Various | 484 | 30% | 37% | 37% | 39% | — |
| Pentane | Dimethylsulfide (DMS) | 89 | 0% | 53% | 4% | 54% | — |
| Pentane | Dimethyldisulfide (DMDS) | 133 | 0% | 59% | 6% | 57% | — |
| Pentane | CS2 | 227 | 0% | 30% | 3% | 99% | — |
| Pentane | Ethyl Mercaptan | 59 | 99% | 55% | 99% | 63% | — |
| Pentane | Butyl Mercaptan | 53 | 66% | 32% | 99% | 54% | — |
| Pentane | DMS, DMDS, CS2, Ethyl RSH | 49 | 20% | | | 65% | 76% |
| Kerosene | Dimethylsulfide (DMS) | 55.5 | 12% | 58% | 15% | 89% | 65% |
| Kerosene | Dimethyldisulfide (DMDS) | 91.6 | 1% | 59% | 3% | 69% | 62% |
| Kerosene | CS2 | 128.79 | 3% | 44% | 7% | 99% | 65% |
| Kerosene | Ethyl Mercaptan | 53.4 | 93% | 55% | 93% | 67% | — |
| Kerosene | Thiophenes | 140.59 | 1% | 56% | 3% | 67% | 68% |
| Kerosene | Various | 454.7 | 12% | 51% | 17% | 70% | — |

TABLE 3

Comparing Reduction of Thiophenes from Refinery B Gasoline Using Various Extraction Solvents

| Sample | Sulfur Compounds | Sulfur Content, ppm | % Sulfur Reduction |
|---|---|---|---|
| Refinery B Gasoline Blank | Thiophenes | 223 | — |
| Refinery B Gasoline w/Na Borohydride | | 228 | 0% |
| Refinery B w/50% Na Borohydride (in Methanol) | | 216 | 3% |
| Refinery B Gasoline w/Quaternary Ammonium Hydroxide | | 219 | 2% |
| Refinery B Gasoline w/DETA | | 120 | 43% |
| Refinery B Gasoline w/2-Pyrollidone | | 79 | 65% |

TABLE 4

Comparing Reduction of Various Sulfur Compounds from Refinery M ULSK Using Various Extraction Solvents

| Sample | Sulfur Compounds | Sulfur Content, ppm | % Sulfur Reduction |
|---|---|---|---|
| Refinery M ULSK Baseline | Various compounds | 675 | — |
| Refinery M ULSK w/50% Na Borohydride | | 670 | 1% |
| Refinery M ULSK w/Quaternary Ammonium Hydroxide | | 664 | 2.0% |
| Refinery M ULSK w/90/10 NMP/H2O | | 327 | 52% |
| Refinery M ULSK w/DETA | | 320 | 52% |

TABLE 5

Comparing Reduction of Benzothiophenes and Dibenzothiophenes from Refinery A Diesel Using Various Extraction Solvents

| Sample | Sulfur Compounds | Sulfur Content, ppm | % Sulfur Reduction |
|---|---|---|---|
| Refinery A Diesel Baseline | Benzothiophenes, Dibenzothiophenes | 249.48 | — |
| Refinery A Diesel w/50% Na Borohydride | | 246.79 | 1% |
| Refinery A Diesel w/ Quaternary Ammonium Hydroxide | | 244.23 | 2% |
| Refinery A Diesel w/90/10 NMP/H2O | | 197.16 | 21% |
| Refinery A Diesel w/DETA | | 204.94 | 18% |

TABLE 6

Comparing Reduction of Various Sulfur Compounds from Terminal C Natural Gas Using Various Extraction Solvents

| Sample | Sulfur Compounds | Sulfur Content, ppm | % Sulfur Reduction |
|---|---|---|---|
| Terminal C Natural Gas Baseline | Various compounds | 139.28 | — |
| Terminal C Natural Gas w/50% Na Borohydride | | 118 | 16% |
| Terminal C Natural Gas w/50% Na Borohydride (Buyout) | | 117 | 15% |
| Terminal C Natural Gas w/ Quaternary Ammonium Hydroxide | | 98.77 | 29% |
| Terminal C Natural Gas w/90/10 NMP/H2O | | 84.98 | 39% |
| Terminal C Natural Gas w/DETA | | 79.76 | 43% |

TABLE 7

Comparing Reduction of Various Sulfur Compounds from Terminal C Cat Naphtha Using Various Extraction Solvents

| Sample | Sulfur Compounds | Sulfur Content, ppm | % Sulfur Reduction |
|---|---|---|---|
| Terminal C Cat Naphtha Baseline | Various compounds | 222 | — |
| Terminal C Cat Naphtha w/50% Na Borohydride | | 209 | 6% |
| Terminal C Cat Naphtha w/ Quaternary Ammonium Hydroxide | | 204 | 8% |
| Terminal C Cat Naphtha w/ 90/10 NMP/H2O | | 104 | 53% |
| Terminal C Cat Naphtha w/ DETA | | 109 | 51% |

TABLE 8

Comparing Reduction of Various Sulfur Compounds from Terminal P Gasoline Using Various Extraction Solvents

| Sample | Sulfur Compounds | Sulfur Content, ppm | % Sulfur Reduction |
|---|---|---|---|
| Terminal P Gasoline Baseline | Thiophenes, Diethyl Sulfides, Isopropyl RSH, Methyl Ethyl RSH, Dimethyl Disulfides, Isobutyl RSH | 448 | — |
| Terminal P Gasoline w/50% Na Borohydride (In Methanol) | | 367 | 18 |
| Terminal P Gasoline w/ Quaternary Ammonium Hydroxide | | 370 | 17 |
| Terminal P Gasoline with 65% Na Borohydride (in water) | | 376 | 16 |
| Terminal P Gasoline w/Na Borohydride | | 389 | 13 |
| Terminal P Gasoline Blank Retest | | 468 | — |
| Terminal P Gasoline w/DETA | | 289, 279 | 40 |
| Terminal P Gasoline w/2-Pyrrolidone | | 294 | 37 |

In the foregoing specification, the invention has been described with reference to specific embodiments thereof. However, the specification is to be regarded in an illustrative rather than a restrictive sense. For example, hydrocarbon streams, ethyleneamines, co-solvents, contaminants, contact/extraction processes, and separation mechanisms falling within the claimed or disclosed parameters, but not specifically identified or tried in a particular example, are expected to be within the scope of this invention.

The present invention may be practiced in the absence of an element not disclosed. In addition, the present invention may suitably comprise, consist or consist essentially of the elements disclosed. For instance, the process may comprise, consist of, or consist essentially of contacting a hydrocarbon stream containing non-acidic contaminants with an extraction solvent consisting essentially of or consisting of one or more ethyleneamines having structure (I), (II), or (III):

(I)

(II)

(III)

where $R_1$-$R_6$ can independently be H, $C_1$-$C_4$ linear or branched alkyl, amido (RRNC=O), or hydroxyalkyl, where each R in the amido group is independently H or $C_1$ alkyl, and where x ranges from 1 to 6.

Alternatively, the treated fluid may comprise, consist of, or consist essentially of a hydrocarbon stream containing non-acidic contaminants; and an extraction solvent consisting of or consisting essentially of one or more ethyleneamines having structure (I), (II), or (III):

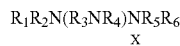
(I)

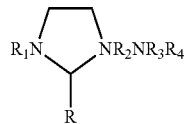
(II)

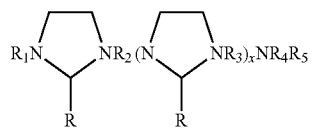
(III)

where R-$R_6$ can independently be H, $C_1$-$C_4$ linear or branched alkyl, amido (RRNC=O), or hydroxyalkyl, where each R in the amido group is independently H or $C_1$ alkyl, and where x ranges from 1 to 6.

The words "comprising" and "comprises" as used throughout the claims, are to be interpreted to mean "including but not limited to" and "includes but not limited to", respectively.

As used herein, the word "substantially" shall mean "being largely but not wholly that which is specified."

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claim is:

1. A process for removal of non-acidic contaminants from a hydrocarbon stream comprising the contaminants, the process comprising:
    contacting the hydrocarbon stream containing non-acidic contaminants selected from a group consisting of thiophenes, benzothiophenes, alkyl sulfides, alkyl disulfides, mercaptans, aromatics, oxygenates, metals, olefins, and combinations thereof with an extraction solvent comprising one or more ethyleneamines having structure (I), (II), or (III):

(I)

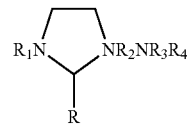
(II)

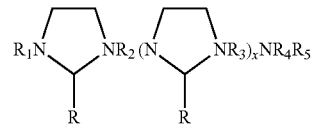
(III)

where $R_1$ is H, $R_2$-$R_6$ is, to the extent chemically possible, independently H, $C_1$-$C_4$ linear or branched alkyl, amido (RRNC=O), or hydroxyalkyl, where each R in the amido group is independently H or $C_1$ alkyl, and where x ranges from 1 to 6; and upon contacting the hydrocarbon stream with the extraction solvent, a portion of the non-acidic contaminants are removed from the hydrocarbon stream.

2. The process of claim 1, wherein the ratio of the one or more ethyleneamines to hydrocarbon in the hydrocarbon stream ranges from about 1:10 to about 95:100.

3. The process of claim 1, wherein the extraction solvent comprises triethylenetriamine or diethylenetriamine.

4. The process of claim 1, wherein the extraction solvent further comprises a co-solvent selected from a group consisting of water, an alcohol, a glycol, an amide, an ester, an amine different from the ethyleneamine, a quaternary ammonium compound, and combinations thereof.

5. The process of claim 1, wherein the hydrocarbon stream is selected from the group consisting of a gas stream, a liquid stream, and combinations thereof.

6. The process of claim 1, wherein the contacting is achieved by an extraction process having a counter-flow design between the hydrocarbon stream and the extraction solvent.

7. The process of claim 1, wherein the contacting is achieved by injecting the extraction solvent directly into the hydrocarbon stream.

8. The process claim 1, further comprising creating an immiscible two-phase liquid comprising a contaminant-laden extraction solvent stream and a hydrocarbon stream having a reduced amount of non-acidic contaminants after the hydrocarbon stream is contacted with the extraction solvent.

9. The process of claim 8, wherein the contaminant-laden extraction solvent stream is separated from the hydrocarbon stream having a reduced amount of non-acidic contaminants using a separation mechanism selected from the group consisting of a knockout drum, a centrifuge, an absorbent material, and combinations thereof thereby giving a separated contaminant-laden extraction solvent stream.

10. The process of claim 9, further comprising regenerating the separated contaminant-laden extraction solvent stream by passing the contaminant-laden extraction solvent stream through selective filtration media or additional adsorption material thereby removing the contaminants.

* * * * *